US011799407B2

(12) United States Patent
Becker et al.

(10) Patent No.: US 11,799,407 B2
(45) Date of Patent: Oct. 24, 2023

(54) DRIVE SYSTEM AND METHOD FOR CONTROLLING A SYNCHRONOUS MOTOR HAVING SEVERAL PHASES

(71) Applicant: Knorr-Bremse Systeme Fuer Nutzfahrzeuge GmbH, Munich (DE)

(72) Inventors: Kai-Sven Becker, Schwieberdingen (DE); Zeger Bontinck, Muehlacker (DE); Ali Terro, Munich (DE); Viktor Tihanyi, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 17/764,754

(22) PCT Filed: Oct. 6, 2020

(86) PCT No.: PCT/EP2020/077925
§ 371 (c)(1),
(2) Date: Mar. 29, 2022

(87) PCT Pub. No.: WO2021/073934
PCT Pub. Date: Apr. 22, 2021

(65) Prior Publication Data
US 2022/0360203 A1 Nov. 10, 2022

(30) Foreign Application Priority Data
Oct. 15, 2019 (EP) .................... 19203433

(51) Int. Cl.
*H02P 21/14* (2016.01)
*H02P 29/024* (2016.01)
(52) U.S. Cl.
CPC ............ *H02P 21/14* (2013.01); *H02P 29/024* (2013.01)

(58) Field of Classification Search
CPC ........ H02P 21/14; H02P 29/024; H02P 6/085; H02P 29/0243; H02P 6/34; H02P 21/0017; H02P 25/022; H02P 2207/05
(Continued)

(56) References Cited

U.S. PATENT DOCUMENTS 8,253,360 B2 * 8/2012 Schulz .................... H02P 21/04
318/811
8,780,594 B2 * 7/2014 Chi ........................ H02P 27/08
318/400.26

(Continued)

FOREIGN PATENT DOCUMENTS

CN 105245159 A 1/2016
CN 106019073 A 10/2016
(Continued)

OTHER PUBLICATIONS

Hang, Jun et al., "Detection and Discrimination of Open-Phase Fault in Permanent Magnet Synchronous Motor Drive System", IEEE Transactions on Power Electronics, Institute of Electrical and Electronics Engineers, USA, vol. 31, No. 7, Jul. 1, 2016, pp. 4697-4709.

(Continued)

*Primary Examiner* — David Luo
(74) *Attorney, Agent, or Firm* — NORTON ROSE FULBRIGHT US LLP; Gerard Messina

(57) ABSTRACT

A drive system and method for controlling a synchronous motor having several phases, in which a method for controlling a drive system includes a synchronous motor having several phases comprises the steps: providing appropriate operating parameters for the synchronous motor by processing an input of the drive system; in case of a determination of a fault of one of the phases, calculating a zero sequence voltage for a neutral conductor based on motor parameters estimated by a parameter estimation algorithm based on (Continued)

detected operating parameters; and applying the calculated zero sequence voltage to the neutral conductor.

7 Claims, 2 Drawing Sheets

(58) Field of Classification Search
USPC .............................. 318/400.02, 400.01, 700
See application file for complete search history.

(56) References Cited

U.S. PATENT DOCUMENTS

| | | | |
|---|---|---|---|
| 9,543,879 B2* | 1/2017 | Toliyat | ................ H02P 29/0241 |
| 10,027,263 B2* | 7/2018 | Toens | ........................ H02P 6/12 |

FOREIGN PATENT DOCUMENTS

| | | |
|---|---|---|
| CN | 107590323 A | 1/2018 |
| JP | 2007/099066 A | 4/2007 |
| JP | 2011/089656 A | 5/2011 |

OTHER PUBLICATIONS

Tousizadeh, Mahdi et al., "Fault-Tolerant Field-Oriented Control of Three-Phase Induction Motor Based on Unified Feedforward Method", IEEE Transactions on Power Electronics, Institute of Electrical and Electronics Engineers, USA, vol. 34, No. 8, Aug. 1, 2019, pp. 7172-7183.

Mishra, Priyanka, et al., "Voltage control of PV inverter connected to unbalanced distribution system", IET Renewable Power Generation, The Institution of Engineering and Technology, Michael Faraday House, Six Hills Way, Stevenage, Herts. SG1 2AY, UK, vol. 13, No. 9, Jul. 8, 2019, pp. 1587-1594.

Feng, Jian et al., "Scheme based on buck-converter with three-phase H-bridge combinations for high-speed BLDC motors in aerospace applications", IET Electric Power Applications, IET, UK, vol. 12, No. 3, Mar. 1, 2018, pp. 405-414.

Cárdenas, Roberto, et al., "Overview of Control Systems for the Operation of DFIGs in Wind Energy Applications", IEEE Transactions on Industrial Electronics, IEEE Service Center, Piscataway, NJ, USA, vol. 60, No. 7, Jul. 1, 2013, pp. 2776-2798.

Kivanc, O.C. et al., "Electro-hydraulic power steering system modelling for parameter fault detection based on model reference adaptive frame", IECON 2016—42nd Annual Conference of the IEEE Industrial Electronics Society, IEEE, Oct. 23, 2016, pp. 1808-1814.

International Search Report dated Nov. 18, 2020 in connection with PCT/EP2020/077925.

* cited by examiner

DRIVE SYSTEM AND METHOD FOR CONTROLLING A SYNCHRONOUS MOTOR HAVING SEVERAL PHASES

FIELD OF THE INVENTION

The present invention relates to a drive system and a method for controlling a synchronous motor having several phases, in particular to a drive system and a method controlling a synchronous motor having several phases in case of a fault of one of the phases.

BACKGROUND INFORMATION

During life time, faults of an electric motor may occur. Such faults may be wearing of an insulation around a wire of a coil of a phase of a three-phase synchronous motor. This wearing may lead to a short circuit. Further, in extreme cases, one of the phases is disconnected so that only two phases are available to control such a motor.

A drive may be composed of a three-phase ("abc") star-connected permanent magnet synchronous motor provided with a four-leg inverter, wherein three of the legs are connected to the phases and a fourth leg is connected to a neutral point. Such a drive can remain in operation even when one of the legs or one of the phases of the motor is out of operation. For maintaining the operation, different types of control algorithms are available, such as a "dq0-hysteresys control", a "dq0-PI-control", and a $V_O$ feedforward control. However, after a phase fault, using a PI controller to control sinus reference values of the current of the neutral point ($I_0$) may cause many problems such as to rev up of the system. Indeed, the $V_O$ feedforward control by the proportional-integral (PI) controller is known to generate low torque ripple after occurrence of the fault; however, this control is strongly influenced by variations on motor parameters, such as a resistance R and inductances L. Deviations between the actual values of the theses parameters and arbitrarily assumed values of these parameters lead to inefficient control of the motor and, thus, they produce ripple of the torque of the motor.

SUMMARY OF THE INVENTION

Therefore, an object underlying the invention is to remedy the above disadvantages and to provide a method for improving a behavior of a three-phase star-connected permanent magnet synchronous motor in case of fault of one of the phases.

The object may be achieved by a drive system according to the description herein, a method according to the description herein, and a computer program product according to the description herein. Advantageous further developments are included in the further descriptions herein.

According to an aspect of the invention, a drive system comprises a synchronous motor having several phases, an input interface configured to input operating parameters, a first device configured to execute a control algorithm for controlling the synchronous motor during operation without a fault of one of the phases, a second device configured to execute a control algorithm for controlling the synchronous motor during operation in case of the determination of a fault of one of the phases, a switch configured to switch between the first device and the second device depending on the determination of a fault of one of the phases, a driver device configured to provide appropriate operating parameters for the synchronous motor, sensors configured to detect a position and a current of the synchronous motor, and a parameter estimator configured to execute a parameter estimation algorithm to estimate motor parameters based on the detected position and current of the synchronous motor. The drive system is configured to provide a zero sequence voltage calculated based on the estimated motor parameters for a neutral connector of the synchronous motor.

This drive system improves control of the synchronous motor since, in case of the fault of one of the phases, the zero sequence voltage for the neutral connector can be calculated more exact than arbitrarily assumed parameters so that ripple of the torque of the synchronous motor can be avoided or decreased in case of the fault of one of the phases.

According to a further aspect of the invention, a method for controlling a drive system including a synchronous motor having several phases comprises the steps: providing operating parameters for the synchronous motor by processing input of the drive system, in case of a determination of a fault of one of the phases, calculating a zero sequence voltage for a neutral conductor based on motor parameters estimated by a parameter estimation algorithm based on detected operating parameters, and applying the calculated zero sequence voltage to the neutral conductor.

The use of the estimated motor parameters improves control of the synchronous motor since these values are more exact than arbitrarily assumed motor parameters so that ripple of the torque of the synchronous motor can be avoided or reduced in case of the fault of one of the phases.

In an advantageous implementation of the method, the motor parameters comprise an inductance and a phase resistance.

By estimating these motor parameters, the operating characteristic of the synchronous motor can be controlled in a manner to avoid rev up of the synchronous motor.

In a further advantageous implementation of the method, the parameter estimation algorithm is based on a Model-Reference-Adaptive-Control model.

By estimating the motor parameters based on this model, a model for suitably estimating realistic motor parameters is provided and appropriate motor parameters are estimated.

By a further advantageous implementation of the method, a control algorithm for an operation without a fault of one of the phases is provided, a control algorithm including the parameter estimation algorithm for an operation in case of the determination of a fault of one of the phases is provided; and in case of the determination of a fault of one of the phases, the synchronous motor is controlled by the control algorithm including the parameter estimation algorithm for an operation in case of the determination of a fault of one of the phases.

By using different control algorithm for the operation without a fault of one of the phases and for the operation in case of the determination of a fault of one of the phases, control algorithms optimized for the respective operation condition can be executed.

In a further implementation of the method, the zero sequence voltage is calculated based on a feedforward method.

By using the feedforward method, rev up of the synchronous motor can be avoided.

Due to a further implementation of the method, the operating parameters comprise at least one of a voltage, a current and a frequency.

By using these parameters, exact motor parameters can be estimated from the operating parameters.

According to a further aspect of the invention, a computer program product comprises instructions which, when the program is executed by a computer, cause the computer to carry out the method.

Below, the invention is depicted by embodiments referring to the attached drawing.

DETAILED DESCRIPTION

Figure 1:
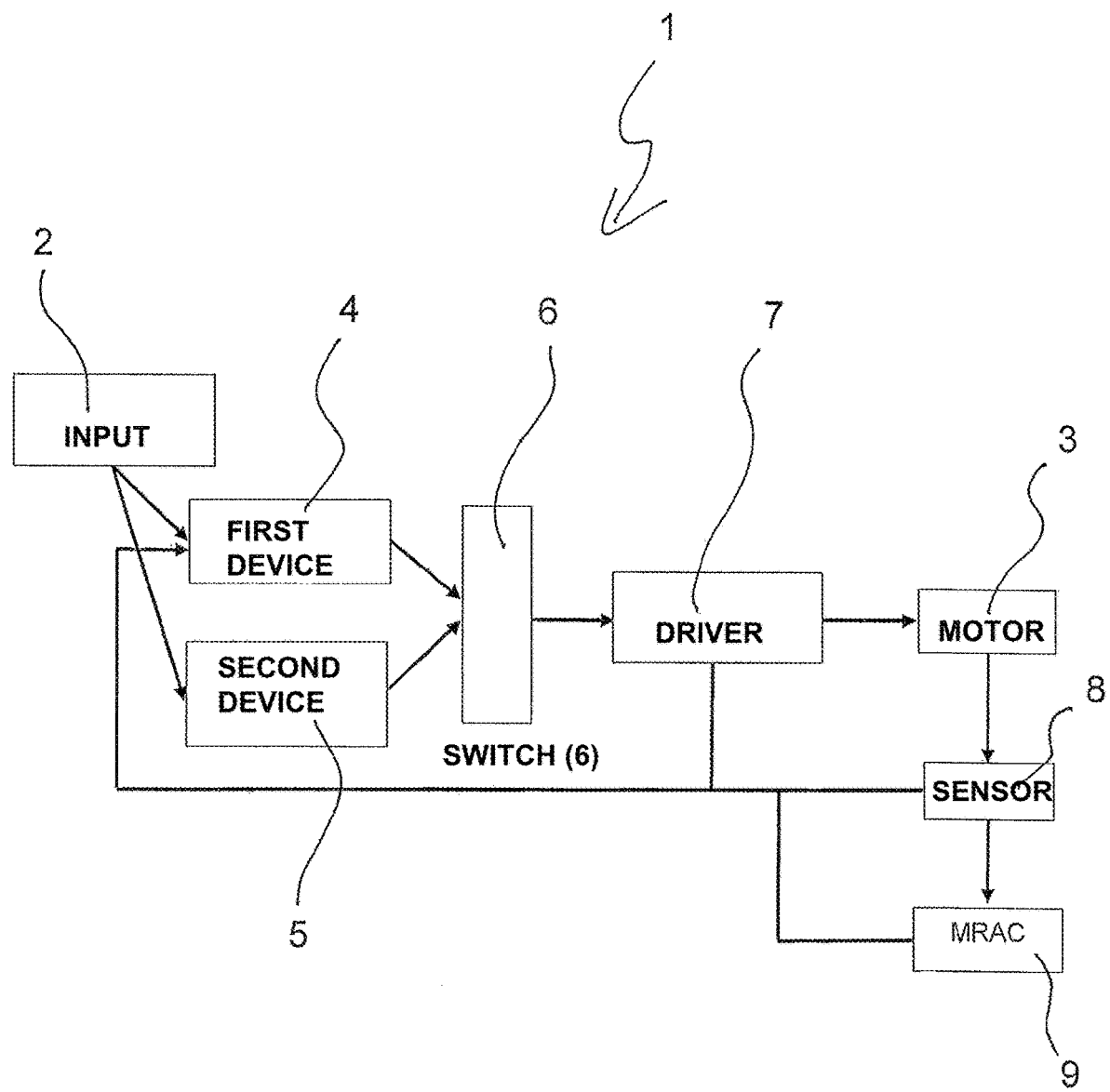
FIG. 1 shows a block diagram of a drive system for providing a method according to the invention.
Figure 2:
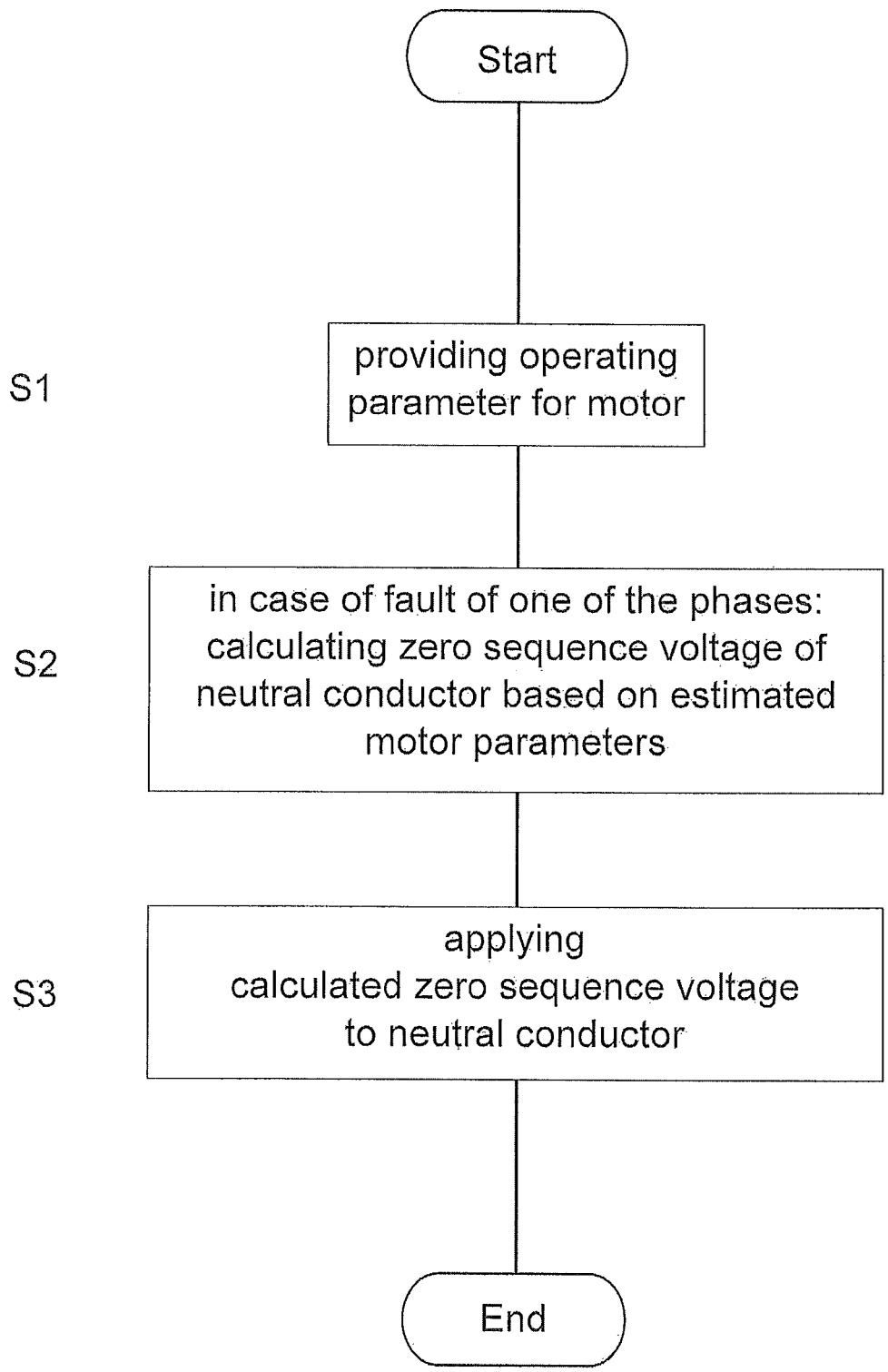
FIG. 2 shows a flow chart of the method according to the invention.

FIG. 1 shows a block diagram of a drive system 1 for providing a method according to the invention.

The drive system 1 comprises a synchronous motor 3 having several phases and an input interface 2 for inputting operating parameters for the synchronous motor 3. In this embodiment, the synchronous motor has three phases. Alternative, another quantity of phases larger than 1 is provided. The operating parameters comprise a voltage $U_{d,q}$, a current $i_{d,q}$, and an electric speed $\omega_e$. Alternatively, not all of these operating parameters are input.

Further, the drive system 1 further comprises a first device 4 configured to execute a control algorithm for controlling the synchronous motor 3 during operation without a fault of one of the phases and a second device 5 configured to execute a control algorithm for controlling the synchronous motor 3 during operation in case of the determination of a fault of one of the phases. Alternatively, one control algorithm covering both operation conditions or one device comprising both control algorithms is provided.

Moreover, the drive system 1 comprises a switch 6 for switching between the first device 4 and the second device 5 depending on the determination of a fault of one of the phases.

The drive system 1 further comprises a driver 7 providing appropriate operating parameters for the synchronous motor 3.

Sensors 8, in this embodiment a position sensor and a current sensor, are provided in the drive system 1 for detecting a position and a current of the synchronous motor 3.

Finally, the drive system 1 comprises a parameter estimator 9. The parameter estimator 9 executes a parameter estimation algorithm in order to estimate an inductance L and phase resistance R. Alternatively, other operating parameters, such as a permanent magnet flux linkage $\Psi_{PM}$ is estimated. The parameter estimator 9 executes the parameter estimation algorithm based on a Model-Reference-Adaptive-Control (MRAC)—model. Alternatively, another parameter estimation algorithm, e.g. based on an "Extended-Kalman-Filter", is executed.

In use, in the drive system 1, the appropriate operating parameters, i.e. the voltage $u_{d,q}$, the current $i_{d,q}$, and the electric speed $\omega_e$, are provided for the synchronous motor 3 in step S1.

In case of a determination of a fault of one of the phases, in step 2, a zero sequence voltage for a neutral conductor is calculated based on motor parameters, i.e., the inductance L and the phase resistance R, estimated by the parameter estimation algorithm based on the detected operating parameters $u_{d,q}$, $i_{d,q}$, $\omega_e$. The parameter estimation algorithm is based on the Model-Reference-Adaptive-Control MRCA model. Alternatively, another parameter estimation algorithm, e.g., an Extended-Kalman-Filter is used.

In case of no determination of a fault of one of the phases, the control algorithm for an operation without a fault of one of the phases is used.

In step S3, the zero sequence voltage calculated based on a feedforward method is applied to the neutral conductor. Alternatively, other motor parameters, e.g. the permanent magnet flux linkage $\Psi_{PM}$ or not all of the operating parameters or other operating parameters are used or the zero sequence voltage is calculated based on another method, e.g., by a proportional-integral controller.

An input from the input interface 2 is forwarded to the control algorithm for an operation without a fault of one of the phases and to the control algorithm for an operation in case of the determination of a fault of one of the phases. Depending on a detection if a fault of one of the phases is present, the input is processed by anyone of the first device 4 and the second device 5. Depending on this detection, further, via the switch 6, the output of the first device 4 or of the second device 5 are forwarded to the driver 7 which provides appropriate operating parameters to the synchronous motor 3. The sensors 8 provide the operating parameters of the position and the current for the driver 7 and for the first and second devices 4 and 5. The parameter estimator 9 provides the estimated operating parameters L and R for the driver 7 and the devices 4 and 5.

The invention has been described in conjunction with various embodiments herein. However, other variations to the disclosed embodiments can be understood and effected by those skilled in the art in practicing the claimed invention, from a study of the drawings, the disclosure and the appended claims. Such modifications may involve other features, which are already known in the art and may be used instead of or in addition to features already described herein. In the claims, the word "comprising" does not exclude other elements or steps, and the indefinite article "a" or "an" does not exclude a plurality.

THE LIST OF REFERENCE SIGNS IS AS FOLLOWS 1 drive system
2 input interface
3 synchronous motor
4 first device
5 second device
6 switch
7 driver
8 sensors (position sensor and current sensor)
9 parameter estimator
MRCA model reference adaptive control

The invention claimed is:
1. A drive system, comprising:
a synchronous motor having several phases;
an input interface to input operating parameters to the synchronous motor;
a first device to execute a control algorithm for controlling the synchronous motor during operation without a fault of one of the phases;
a second device to execute a control algorithm for controlling the synchronous motor during operation when there is a determination of a fault of one of the phases;
a switch to switch between the first device and the second device depending on the determination of a fault of one of the phases;

a driver device to provide appropriate operating parameters for the synchronous motor;

sensors to detect a position and a current of the synchronous motor; and a parameter estimator to execute a parameter estimation algorithm to estimate motor parameters based on the detected position and current of the synchronous motor;

wherein the drive system is configured to provide a zero sequence voltage calculated based on the estimated motor parameters for a neutral connector of the synchronous motor, wherein the operating parameters, which are input via the input interface, include at least two of a voltage, a current, an electric speed, and a frequency, wherein the motor parameters include an inductance, a phase resistance, and a permanent magnet flux linkage, and wherein the input from the input interface is forwarded to the control algorithm for the operation without a fault of one of the phases and to the control algorithm for the operation when there is the determination of a fault of one of the phases, wherein depending on the detection if a fault of one of the phases is present, the input is processed by the first device or the second device, wherein depending on the detection, via the switch, an output of the first device or of the second device is forwarded to the driver device which provides the operating parameters to the synchronous motor, and wherein the sensors provide the operating parameters of the position and the current for the driver device and for the first device and the second device.

2. A method for controlling a drive system, including a synchronous motor having several phases, the method comprising providing, via an input interface, operating parameters for the synchronous motor by processing input of the drive system;

calculating, for a determination of a fault of one of the phases, a zero sequence voltage for a neutral conductor based on motor parameters estimated by a parameter estimation algorithm based on detected operating parameters; and applying the calculated zero sequence voltage to the neutral conductor;

wherein the operating parameters, which are input via an input interface, include at least two of a voltage, a current, an electric speed, and a frequency, wherein the motor parameters include an inductance, a phase resistance, and a permanent magnet flux linkage, and wherein the input from the input interface is forwarded to the control algorithm for the operation without a fault of one of the phases and to the control algorithm for the operation when there is the determination of a fault of one of the phases, wherein depending on a detection if a fault of one of the phases is present, the input is processed by a first device or a second device, wherein depending on the detection, via a switch, an output of the first device or of the second device is forwarded to a driver device which provides the operating parameters to the synchronous motor, and wherein sensors provide the operating parameters of the position and the current for the driver device and for the first device and the second device.

3. The method of claim 2, wherein the parameter estimation algorithm is based on a Model-Reference-Adaptive-Control (MRCA) model.

4. The method of anyone of claim 2, wherein there is a control algorithm for an operation without a fault of one of the phases, wherein there is a control algorithm including the parameter estimation algorithm for an operation for the determination of a fault of one of the phases, and wherein for the determination of a fault of one of the phases, the synchronous motor is controlled by the control algorithm for an operation in case of the determination of a fault of one of the phases.

5. The method of claim 2, wherein the zero sequence voltage is calculated based on a feedforward method.

6. The method of claim 2, wherein the operating parameters include the voltage, the current, and a frequency.

7. A non-transitory computer readable medium having a computer program, which is executable by a processor, comprising:

a program code arrangement having program code for controlling a drive system, including a synchronous motor having several phases, by performing the following:

providing, via an input interface, operating parameters for the synchronous motor by processing input of the drive system;

calculating, for a determination of a fault of one of the phases, a zero sequence voltage for a neutral conductor based on motor parameters estimated by a parameter estimation algorithm based on detected operating parameters; and applying the calculated zero sequence voltage to the neutral conductor;

wherein the operating parameters, which are input via an input interface, include at least two of a voltage, a current, an electric speed, and a frequency, wherein the motor parameters include an inductance, a phase resistance, and a permanent magnet flux linkage, and wherein the input from the input interface is forwarded to the control algorithm for the operation without a fault of one of the phases and to the control algorithm for the operation when there is the determination of a fault of one of the phases, wherein depending on a detection if a fault of one of the phases is present, the input is processed by a first device or a second device, wherein depending on the detection, via a switch, an output of the first device or of the second device is forwarded to a driver device which provides the operating parameters to the synchronous motor, and wherein sensors provide the operating parameters of the position and the current for the driver device and for the first device and the second device.

* * * * *